United States Patent
Froelich et al.

(10) Patent No.: US 12,055,584 B2
(45) Date of Patent: Aug. 6, 2024

(54) SYSTEMS, METHODS, AND DEVICES FOR HIGH-SPEED INPUT/OUTPUT MARGIN TESTING

(71) Applicant: Tektronix, Inc., Beaverton, OR (US)

(72) Inventors: Daniel S. Froelich, Portland, OR (US); Sam J. Strickling, Portland, OR (US)

(73) Assignee: TEKTRONIX, INC., Beaverton, OR (US)

( * ) Notice: Subject to any disclaimer, the term of this patent is extended or adjusted under 35 U.S.C. 154(b) by 0 days.

(21) Appl. No.: 17/534,409

(22) Filed: Nov. 23, 2021

(65) Prior Publication Data
US 2022/0163588 A1 May 26, 2022

Related U.S. Application Data

(60) Provisional application No. 63/117,971, filed on Nov. 24, 2020.

(51) Int. Cl.
*G01R 31/3183* (2006.01)
*G01R 31/30* (2006.01)
(Continued)

(52) U.S. Cl.
CPC ....... *G01R 31/31707* (2013.01); *G01R 31/30* (2013.01); *G01R 31/31813* (2013.01); *G01R 31/318314* (2013.01); *G01R 31/318385* (2013.01); *G01R 31/318572* (2013.01); *G06F 30/367* (2020.01); *G06F 2115/12* (2020.01);
(Continued)

(58) Field of Classification Search
CPC .............. G01R 31/31707; G01R 31/30; G01R 31/31813; G01R 31/318314; G01R 31/318385; G01R 31/318572; G01R 31/3161; G01R 31/3171; G01R 31/31903;
(Continued)

(56) References Cited

U.S. PATENT DOCUMENTS 5,243,273 A 9/1993 MacAuliffe
6,351,827 B1 2/2002 Co
(Continued)

FOREIGN PATENT DOCUMENTS

JP 2012118002 6/2012
KR 20180006480 1/2018
(Continued)

OTHER PUBLICATIONS

European Patent Office, International Search Report and Written Opinion for International Application No. PCT/US2021/060662, dated Mar. 14, 2022, 16 pages, Rijswijk, Netherlands.
(Continued)

*Primary Examiner* — Christopher P McAndrew
*Assistant Examiner* — Zannatul Ferdous
(74) *Attorney, Agent, or Firm* — Seed IP Law Group LLP; Andrew J. Harrington

(57) ABSTRACT

A margin testing device includes at least one interface structured to connect to a device under test (DUT) one or more controllers structured to create a set of test signals based on a sequence of pseudo random data and one or more pre-defined parameters, and an output structured to send the set of test signals to the DUT. Methods and a system for testing a DUT with the disclosed margin tester and other testing device are also described.

20 Claims, 11 Drawing Sheets

(51) Int. Cl.
    *G01R 31/317*     (2006.01)
    *G01R 31/3181*     (2006.01)
    *G01R 31/3185*     (2006.01)
    *G06F 30/367*     (2020.01)
    *G06F 115/12*     (2020.01)
    *G06F 119/06*     (2020.01)
    *G06F 119/12*     (2020.01)

(52) U.S. Cl.
    CPC ...... *G06F 2119/06* (2020.01); *G06F 2119/12* (2020.01)

(58) Field of Classification Search
    CPC ............. G01R 31/31708; G06F 30/367; G06F 2115/12; G06F 2119/06; G06F 2119/12
    See application file for complete search history.

(56) References Cited

U.S. PATENT DOCUMENTS

| | | | |
|---|---|---|---|
| 6,449,742 | B1 | 9/2002 | Arabi |
| 6,765,877 | B1 | 7/2004 | Foschiano |
| 7,099,438 | B2 | 8/2006 | Rancu |
| 7,139,949 | B1 | 11/2006 | Jennion |
| 7,398,514 | B2 | 7/2008 | Ulrich |
| 7,941,718 | B2* | 5/2011 | Zhang ............ G01R 31/318371 714/728 |
| 9,042,427 | B2* | 5/2015 | Singh ................... H04W 24/06 708/255 |
| 10,255,151 | B1 | 4/2019 | Levin |
| 2004/0078740 | A1 | 4/2004 | Cook |
| 2004/0133834 | A1 | 7/2004 | Kanemitsu |
| 2004/0176924 | A1 | 9/2004 | Salmon |
| 2006/0184332 | A1 | 8/2006 | Ishida |
| 2008/0192814 | A1 | 8/2008 | Hafed |
| 2009/0010171 | A1 | 1/2009 | Gupta |
| 2009/0261807 | A1 | 10/2009 | Sawara |
| 2010/0153052 | A1 | 6/2010 | Schmitz |
| 2010/0313089 | A1 | 12/2010 | Rajski |
| 2011/0187400 | A1 | 8/2011 | Watanabe |
| 2011/0257953 | A1 | 10/2011 | Li |
| 2012/0245879 | A1 | 9/2012 | Mikkola |
| 2013/0033285 | A1 | 2/2013 | McMahon |
| 2013/0145212 | A1 | 6/2013 | Hsu et al. |
| 2014/0112339 | A1 | 4/2014 | Safranek |
| 2014/0229666 | A1 | 8/2014 | Schoenborn et al. |
| 2015/0067207 | A1 | 3/2015 | Iyer |
| 2016/0087822 | A1* | 3/2016 | Kossel ................ H04L 25/4917 375/286 |
| 2016/0266204 | A1 | 9/2016 | Chandra |
| 2017/0019247 | A1 | 1/2017 | Iyer |
| 2018/0045781 | A1 | 2/2018 | Song |
| 2018/0091358 | A1 | 3/2018 | Sasaki |
| 2018/0285225 | A1 | 4/2018 | Kumar et al. |
| 2019/0067056 | A1 | 2/2019 | Shen |
| 2020/0025824 | A1 | 1/2020 | Zhao et al. |
| 2020/0249275 | A1 | 8/2020 | Froelich |
| 2020/0250368 | A1* | 8/2020 | Froelich ................. H04L 43/50 |
| 2021/0405108 | A1 | 12/2021 | Strickling |
| 2021/0406144 | A1 | 12/2021 | Strickling |
| 2022/0091185 | A1 | 3/2022 | Strickling |
| 2022/0317181 | A1* | 10/2022 | Sakare ............... G01R 31/3177 |

FOREIGN PATENT DOCUMENTS

| | | |
|---|---|---|
| TW | I342403 | 5/2011 |
| TW | I440858 | 6/2014 |

OTHER PUBLICATIONS

Timothy Lyons et al., "The Implementation and application of a protocol aware architecture" 2013 IEEE International Test Conference (ITC), Sep. 6, 2013, pp. 1-10, IEEE, Anaheim, California.

Salem Abdennadher et al., Practices in High-Speed IO Testing, 2016 21th IEEE European Test Symposium (ETS), May 23, 2016, p. 1-8, IEEE, Amsterdam, Netherlands.

* cited by examiner

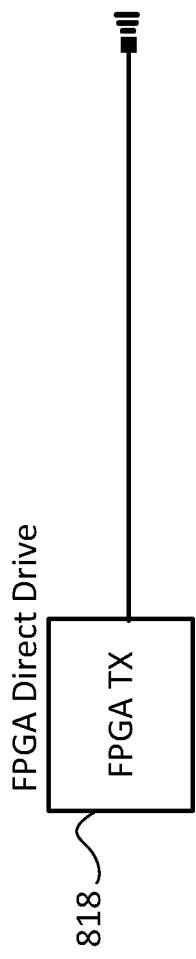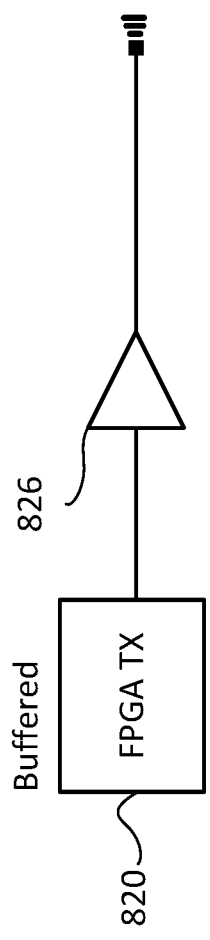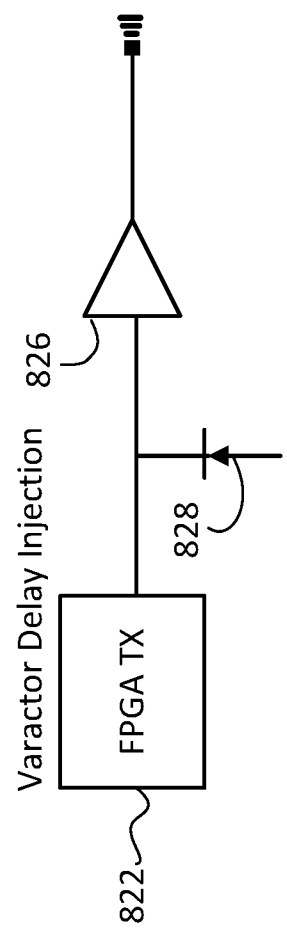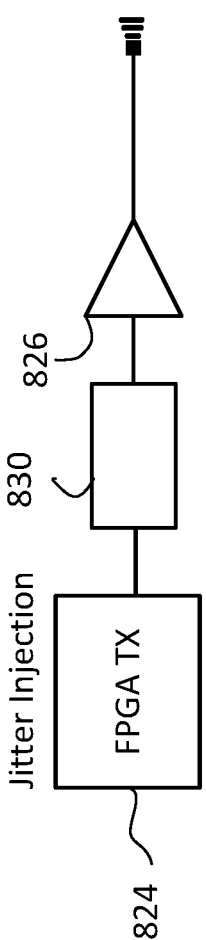

SYSTEMS, METHODS, AND DEVICES FOR HIGH-SPEED INPUT/OUTPUT MARGIN TESTING

CROSS-REFERENCE TO RELATED APPLICATIONS

This disclosure is a non-provisional of and claims benefit from U.S. Provisional Patent Application 63/117,971, entitled SYSTEMS, METHODS, AND DEVICES FOR HIGH-SPEED INPUT/OUTPUT MARGIN TESTING, filed Nov. 24, 2020, which is incorporated by reference herein. This disclosure is also related to U.S. Ser. No. 16/778,249, assigned to the assignee of the present disclosure, which is incorporated herein by reference.

TECHNICAL FIELD

This disclosure relates to test and measurement systems, and more particularly to systems and methods for using electrical margin tests on an electrical device-under-test (DUT) to develop device characterizations.

BACKGROUND

Many communication standards outline a series of stressed test scenarios to determine if a device under test (DUT) passes all performance tests with a specified margin for conformance. Test and measurement instruments having a signal source, such as, for example, arbitrary waveform or function generators and bit error rate testers (BERTs), may be used to generate waveforms for stress testing to measure a performance margin of a DUT in response to the received signals. Such testing may be performed during an engineering characterization stage of designing a new device to compare actual electrical performance of the device to simulated performance to ensure that the device is performing as designed. Such testing may also be performed in a production manufacturing environment after an engineering design is finalized to find any manufacturing defects in each device produced.

Many electrical devices include high-speed I/O signal paths or busses. For example, modern personal computer (PC) motherboards as well as other types of electrical devices often include high-speed serial PCI Express (also abbreviated as PCIe, or PCI-e) busses, which are busses that are compliant with and perform according to the PCI Express high-speed serial computer expansion bus standard. Format specifications for the PCI Express standard are maintained and developed by the PCI Special Interest Group (PCI-SIG). These busses are typically used for communication between the motherboard and add-in/daughter cards that plug into PCIe connector slots or ports on the motherboard. Many other electrical devices besides motherboards also employ PCIe busses and connectors for high-speed I/O. PCIe Generation 4 (Gen 4 or version 4) devices can achieve bandwidths up to 16 gigatransfers per second (GT/s). PCIe Generation 5 (Gen 5 or version 5) devices can achieve bandwidths up to 32 GT/s.

PCIe devices communicate via a logical connection called an interconnect or link. A link is a point-to-point communication channel between two PCIe ports allowing simultaneous bi-directional traffic. At the physical level, a link is composed of one or more lanes. Low-speed PCIe devices use a single-lane (×1) link, while a high-speed PCIe device, such as a graphics adapter, typically uses a much wider and faster 16-lane (×16) link. A lane is composed of two differential signaling pairs, with one pair for receiving data and the other for transmitting. Thus, each lane is composed of four wires or signal traces. Conventionally, performance of the lanes of a PCIe device is tested using a Bit Error Rate Tester (BERT) and/or a high-speed signal generator and oscilloscope (scope).

At an engineering bench test and/or engineering characterization stage of development of a printed circuit board (PCB), board design high speed routes (e.g. PCIe interconnects) are simulated, or design "recipes" or reference designs are followed. Pre-production board samples are then often built and tested. However, testing each board sample and each lane for all high speed I/Os with Bit Error Rate Test instruments (BERTs) and scopes is typically not feasible due to cost, time, and complexity constraints. In particular, traditional BERTs and scopes for testing high speed I/O standards such as PCIe continue to increase in cost and complexity as data rates increase. A single Transmitter (Tx) and Receiver (Rx) test station for testing a single PCIe lane at a time can cost over one million dollars. The instruments are also difficult to use for traditional Tx and Rx tests and calibrations and expert (often PhD level) users and significant amounts of time are required to ensure measurements are taken correctly and instruments remain in good working order. Further, typical BERTs are capable of testing only one lane at a time, so the testing occurs in an environment different from the real-world operation of these I/O links, which usually form multi-lane links and can suffer significant cross-talk and loading issues during real operation. Thus, using a BERT to test all lanes of a multi-lane device is expensive, time consuming, and does not necessarily test real-world scenarios. As a result of these constraints, traditional BERTs and scopes are used infrequently in volume electrical testing of pre-production silicon, boards, PCBs and cables, and are usually not used at all in production testing.

Present margin testers are able to follow predefined compliance package testing scripts, such as for PCIe, USB, DDR, etc. Passing these scripts ensures minimal compliance to the design and operation specifications. Developing robust designs, however, may require more than the mere minimum of ensuring the new designs pass the minimum testing scripts. Presently there is no ability in a margin tester to develop test scripts that thoroughly test a new design, or to fully characterize a device.

Embodiments of the disclosure address these and other problems of present-day margin testing devices.

BRIEF DESCRIPTION OF THE DRAWINGS

FIGS. 8A, 8B, 8C, and 8D are block diagrams illustrating example output drive options of an FPGA that may be used in a controller of a margin tester for testing the electrical margin of a multi-lane high speed I/O link of a DUT in the Tx direction, according to an example embodiment.

DETAILED DESCRIPTION

Figure 1:
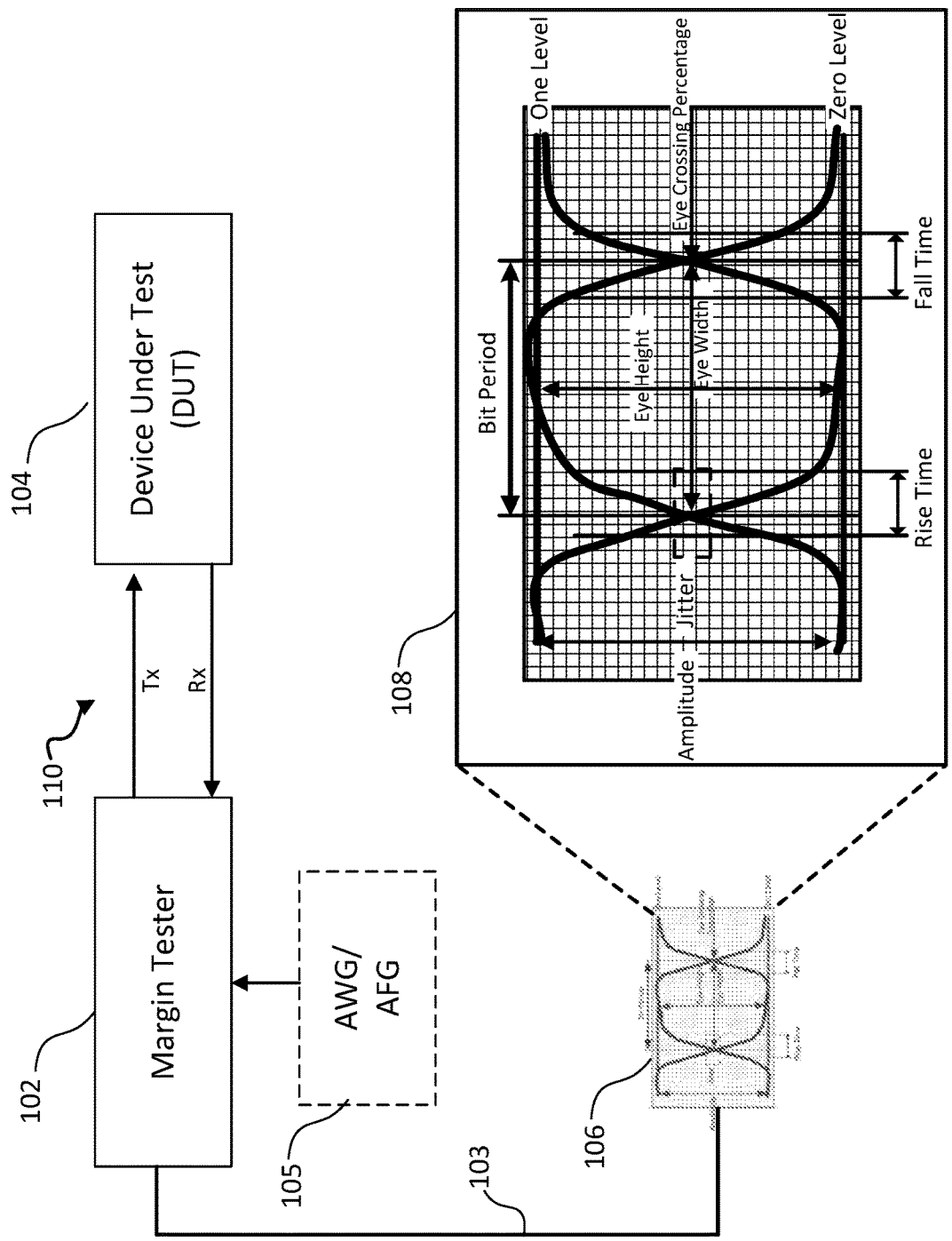
FIG. 1 is an overview block diagram illustrating an example environment in which embodiments of systems, devices and methods for high-speed input/output (I/O) margin testing may be implemented, according to an example embodiment.

FIG. 1 is an overview block diagram illustrating an example environment in which embodiments of systems, devices and methods for high-speed I/O margin testing may be implemented. A margin tester 102 is coupled to a Device Under Test (DUT) 104 through a multi-lane high speed I/O link 110. The I/O link 110 includes both Tx and Rx directions.

The margin tester 102 may be coupled through a data connection 103 to a test station, PC, terminal, oscilloscope, or other display device 106 that may process, replicate and/or present an eye pattern display or data eye diagram 108 representing various aspects of the multi-lane high speed I/O link 110. In some embodiments, the display device 106 is integrated with the margin tester 102. The data passed through the data connection 103 may include a clock signal so that operation of the margin tester 102 may be synchronized with other instruments that may be connected in a test setup. The data connection 103 may also be used to send copies of data sent or received on a transmission (Tx) or receiving (Rx) portion of the I/O link 110, or both to an oscilloscope or other instrument. The data connection 103 may further convey one or more triggers generated by the margin tester 102 based on certain test results. An optional waveform generator 105, such as an Arbitrary Waveform Generator (AWG) or Arbitrary Function Generator (AFG), or both, may be coupled to the margin tester 102 to provide signals for testing, as described below. In some embodiments the waveform generator 105 may be included within the margin tester 102.

The eye pattern display or data eye diagram 108 is a representation of a high speed digital signal that allows key parameters of the electrical quality of a signal to be quickly visualized and determined, and thus data therefrom may be used to determine statistically valid operating margins of a DUT. The eye pattern display or data eye diagram 108 is constructed from a digital waveform by folding the parts of the waveform corresponding to each individual bit into a single graph with signal amplitude on the vertical axis and time on horizontal axis. By repeating this construction over many samples of the waveform, the resultant graph will represent the average statistics of the signal and will resemble an eye. The eye opening corresponds to one bit period and is typically called the Unit Interval (UI) width of the eye pattern display or data eye diagram 108. The bit period is a measure of the horizontal opening of an eye diagram at the crossing points of the eye and is usually measured in picoseconds for a high speed digital signal (i.e., 200 ps is used for a 5 Gbps signal). The data rate is the inverse of bit period (1/bit period). The bit period is commonly called the Unit Interval (UI) when describing an eye diagram. The advantage of using UI instead of actual time on the horizontal axis is that it is normalized and eye diagrams with different data rates can be easily compared. Eye width is a measure of the horizontal opening of an eye diagram. It is calculated by measuring the difference between the statistical mean of the crossing points of the eye. Rise time is a measure of the mean transition time of the data on the upward slope of an eye diagram. The measurement is typically made at the 20 and 80 percent or 10 and 90% levels of the slope. Fall time is a measure of the mean transition time of the data on the downward slope of an eye diagram. The measurement is typically made at the 20 and 80 percent or 10 and 90 percent levels of the slope. Jitter is the time deviation from the ideal timing of a data-bit event and an important characteristic of a high speed digital data signal. To compute jitter, the time deviations of the transitions of the rising and falling edges of an eye diagram at the crossing point are measured. Fluctuations can be random and/or deterministic. The time histogram of the deviations may be analyzed to determine the amount of jitter. The peak-to-peak (p-p) jitter is defined as the full width of the histogram, meaning all data points present. Root mean square (RMS) jitter is defined as the standard deviation of the histogram. The units for a jitter measurement on a high speed digital signal are normally in picoseconds.

Embodiments of the margin tester 102 can take at least two forms: technology-specific and general purpose. The margin tester 102 can be used with any high speed I/O protocol link of any link width (number of lanes) and use any form of high speed differential signaling including, but not limited to, non-return to zero (NRZ), pulse amplitude modulation-3 (PAM-3), and pulse amplitude modulation-4 (PAM-4). For the sake of a specific example embodiment for testing, PCI Express will be used. However, different high-speed serial bus standards, hardware and protocols may be used.

Figure 2:
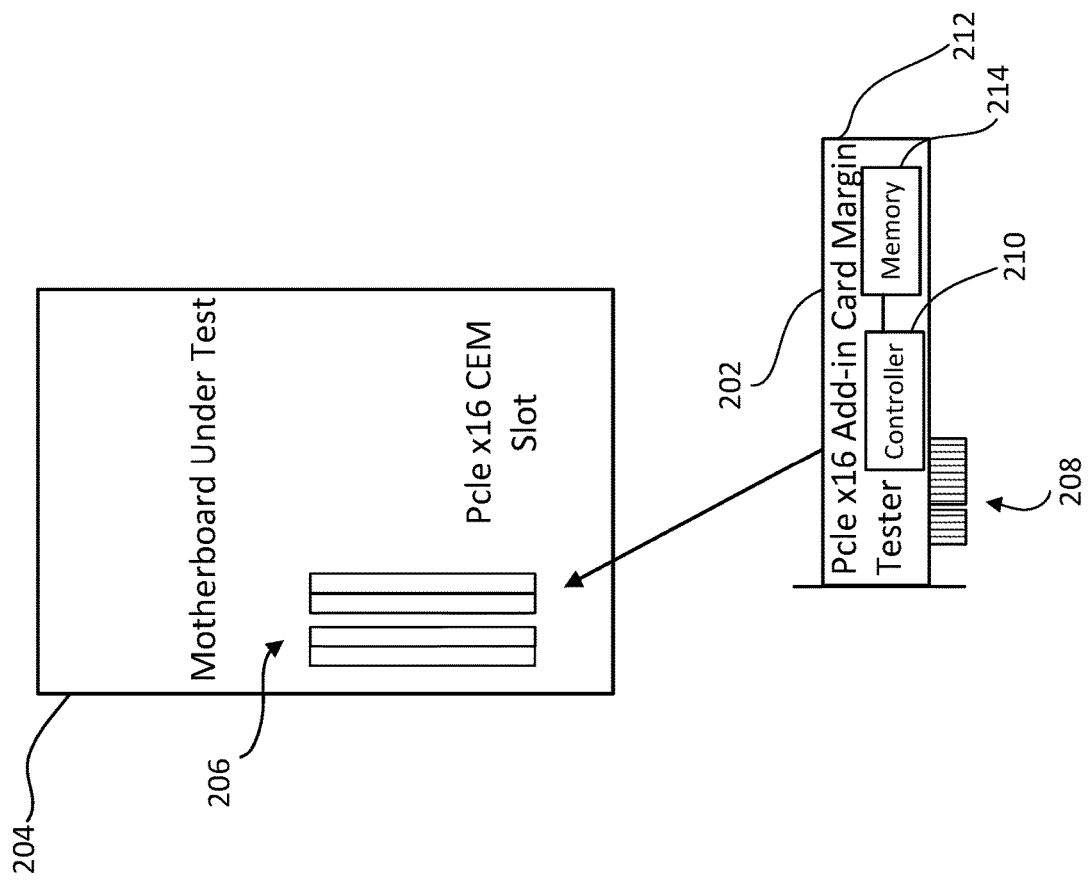
FIG. 2 is a block diagram illustrating an example technology-specific add-in card margin tester compliant with the Peripheral Component Interconnect (PCI) Express high-speed serial computer expansion bus standard to margin test PCI Express motherboard slots, according to an example embodiment.

FIG. 2 is a block diagram illustrating an example technology-specific add-in card margin tester 202 compliant with the PCI Express high-speed serial computer expansion bus standard to margin test PCI Express motherboard slots 206, according to an example embodiment. In a technology-specific form, an embodiment of the margin tester can be implemented as, for example, a PCI Express add-in card margin tester 202 to test PCI Express motherboard slots 206 of a mother board under test 204. For example, the PCI Express add-in card margin tester 202 may be a PCI Express x16 card electromechanical specification (CEM) form factor add-in card.

The PCI Express add-in card margin tester 202 may be in the form factor of a standard PCI Express compliant add-in card for a specific PCI Express form factor (for example, CEM or M.2 (formerly known as the Next Generation Form Factor (NGFF) or U.2 (formerly known as SFF-8639), etc.). The PCI Express add-in card margin tester 202 may include one or more printed circuit boards (PCBs), such as PCB 212 and one or more components that implement compliant PCI Express physical and logical link layers for each lane. The PCI Express add-in card margin tester 202 may have a number of interfaces, such as connectors 208, coupled to the PCB 212 and a controller 210. The controller 210 is not limited to a single controller but may include one or more controllers working in conjunction. The connectors 208 connect the motherboard slots 206 and margin tester transmitters, which, under control of the controller 210, optionally include the ability to inject controlled noise onto the link to test the motherboard 204. The injected noise may include, for example, voltage swing and sinusoidal jitter. Then after such noise is injected, an eye margin expected at the receiver of the motherboard under test 204 can be varied to specific targets for timing or voltage margin without the need for software running on the motherboard under test 204. The controller 210 may also be coupled to memory a 214, which may store instructions and other data the controller 210 may read, use and/or execute to perform the functions described herein.

Various embodiments of the margin tester may be with or without the noise injection. For cost-conscious production tests, the embodiment without noise injection may be more appealing. The margin tester receivers in the compliant physical layer implementation may include the ability to margin the link as defined in the PCI Express 4.0/5.0 lane margining specifications, but may also include additional and more sophisticated on-die margining capabilities. In one embodiment, the margin tester receivers may measure eye margin by moving the independent error detector and comparing for mismatches with the data sampler. In one implementation, the controller 210, which causes the margin tester 102 to perform the functions described herein, may be implemented with a field programmable gate array (FPGA) and the FPGA I/Os, which is shown in further detail in FIGS. 5, 6, and 7. Other combinations of configurable controller hardware, firmware and/or software may also or alternatively be used.

Figure 3:
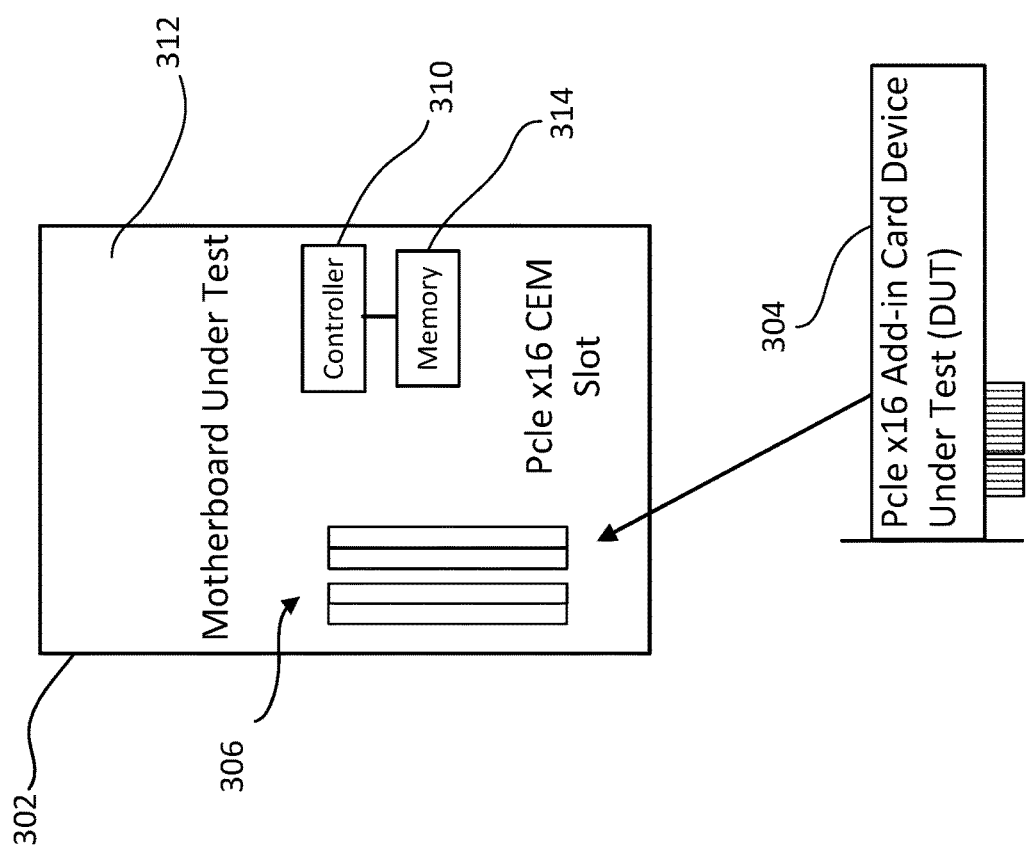
FIG. 3 is a block diagram illustrating a motherboard with slots compliant with the PCI Express high-speed serial computer expansion bus standard to margin test PCI Express add-in cards, according to an example embodiment.

FIG. 3 is a block diagram illustrating an example technology-specific motherboard margin tester 302 with slots compliant with the PCI Express high-speed serial computer expansion bus standard to margin test PCI Express add-in cards, according to an example embodiment. The motherboard margin tester 302 is another example of a technology-specific embodiment of the margin tester 102 disclosed herein, implemented as a motherboard margin tester 302 with one or more PCI Express slots 306 to test PCI Express add-in cards, such as the PCIe ×16 add-in card DUT 304 shown in FIG. 3. The motherboard margin tester 302 may include several interfaces (e.g., one or more PCI Express slots 306) coupled to the PCB 312 and the controller 310. For example, such interfaces may have include one or more PCI Express slots 306 into which the PCIe ×16 add-in card DUT 304 may be inserted for testing. Differently than the embodiment described in FIG. 2, the motherboard margin tester 302 includes a controller 310 and memory 314 to perform the margin tests described above on a DUT 304, which is formed as a PCIe card. The controller 310 and memory 314 may be embodiments of and perform the same functions as controller 210 and memory 214 described above with reference to FIG. 2. The controller 310 may also be configured to assess the electrical margin of the single-lane or multi-lane high speed I/O link by at least being configured to introduce varying amounts of skew lane-to-lane across multiple lanes.

Figure 4:
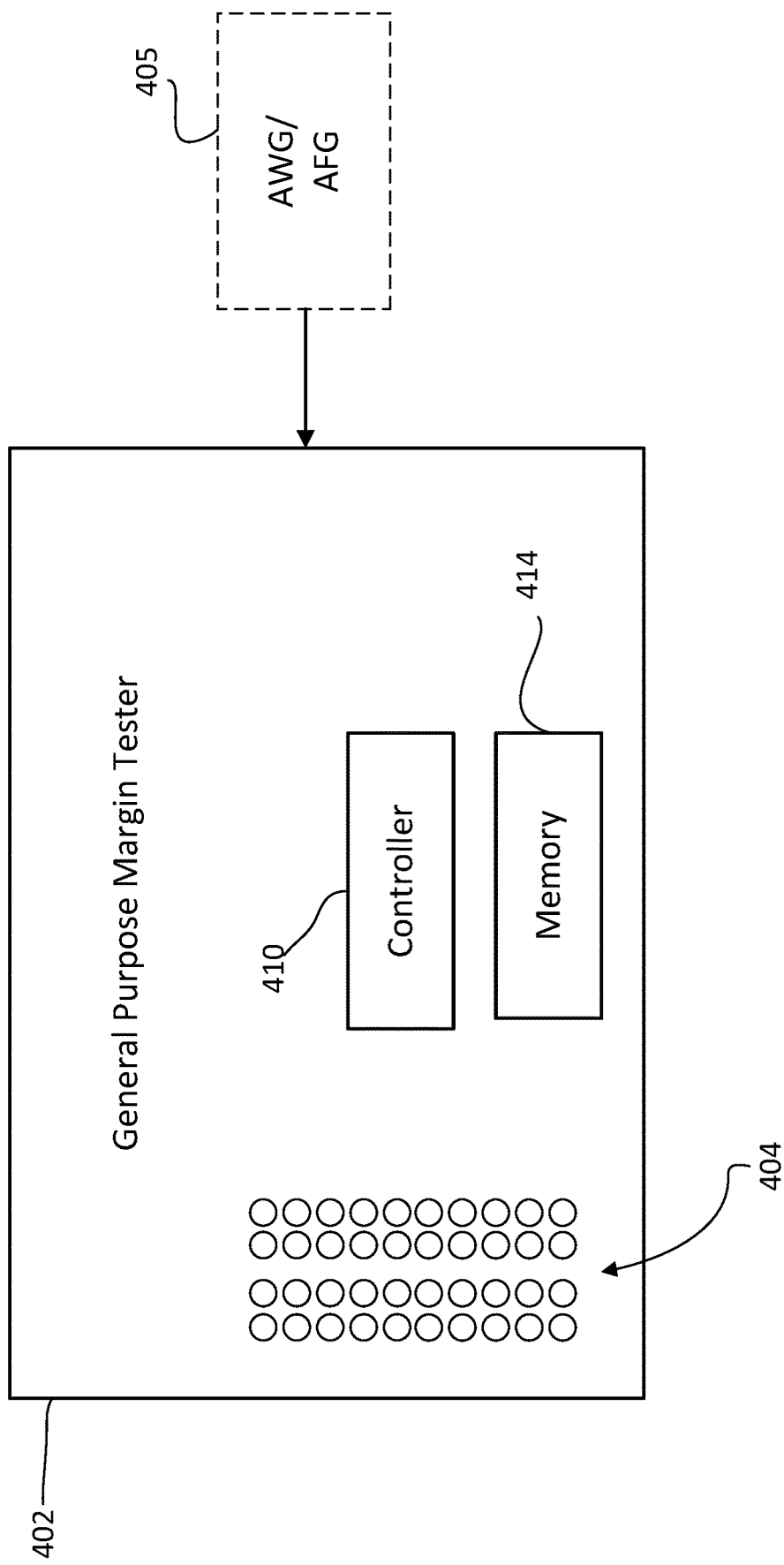
FIG. 4 is a block diagram illustrating a general purpose margin tester with a plurality of interfaces configured to be cabled to at least one test fixture to assess the electrical margin of the multi-lane high speed I/O link of the DUT in both transmit (Tx) and receive (Rx) directions, according to an example embodiment.

FIG. 4 is a block diagram illustrating a general purpose margin tester 402 with a number of individual interfaces 404 configured to be connected, e.g., via one or more cables, to at least one test fixture to assess the electrical margin of the multi-lane high speed I/O link of the DUT in either or both Tx and Rx directions, according to an example embodiment. The general purpose margin tester 402 includes a controller 410 and associated memory 414, which may store instructions and other data the controller 410 may read, use and/or execute to perform the functions described with reference to the controller 210 and memory 214 as described above. The margin tester 402 may accept input from a waveform or function generator 405 for use in testing. The repeated description of those functions and operations is omitted for brevity. The margin tester 402 may also be used to test add-in cards by cabling to test fixtures, including the standard PCI Express Compliance Base Board (CBB) for testing add-in cards. The interfaces 404 of the margin tester 402 may include standard co-axial connectors or other connectors and cables for each high speed differential signal or, in various other embodiments, include custom high density connectors and fixtures to minimize the cable count and make switching from one DUT to another DUT more efficient.

In some examples, the DUT may be an interconnect under test, which are traditionally tested with vector network analyzers (VNAs). However, VNAs are often costly and complex. In addition, the scatter parameters (s-parameters) produced by VNA measurements are generally viewed as increasingly unreliable at high frequencies—especially when used in statistical simulation of high-speed serial links.

Examples of the disclosure, however, can use any of the margin testers 102, 202, 302, or 402 to test a passive or active interconnect, including one or more cables and/or PCB segments, to evaluate an actual margin difference across many lanes and parts quickly. These tests can easily identify worst cases and levels of risk of the interconnects. As such, the margin testers can include a "VNA" mode to test active or passive interconnects.

If a single-port margin tester is used, then the transmitters of the single-port are generally connected to one side of the interconnect under test and the receivers of the single-port are connected to the other side of the interconnect. Then a margin test in non-protocol PRBS can run to test the interconnect under test. Examples of the disclosure however are not limited to a single margin tester to test the interconnect under test. Rather, the test may also be run with the transmitters of one margin tester connected to the interconnect under test and the receivers of another margin tester connected to the other end of the interconnect under test. In this description, the term margin tester 100 may refer to any of the margin testers 102, 202, 302, or 402, or the later-described margin testers 502 or 702, or their equivalents.

Additionally or alternatively, a multi-port margin tester 100 can be used to measure the interconnect under test in an active protocol state after training. In such a set-up, the interconnect under test can be connected to one port of the multi-port margin tester 100 and the other side of the interconnect under test can be connected to another, different port of the multi-port margin tester 100. Then, the interconnect under test can be tested to measure the margin with a protocol in an active protocol state after training. Alternatively, rather than a multi-port tester 100, the multiple margin testers 100 may be used to run the margin test of the interconnect under test.

Figure 5:
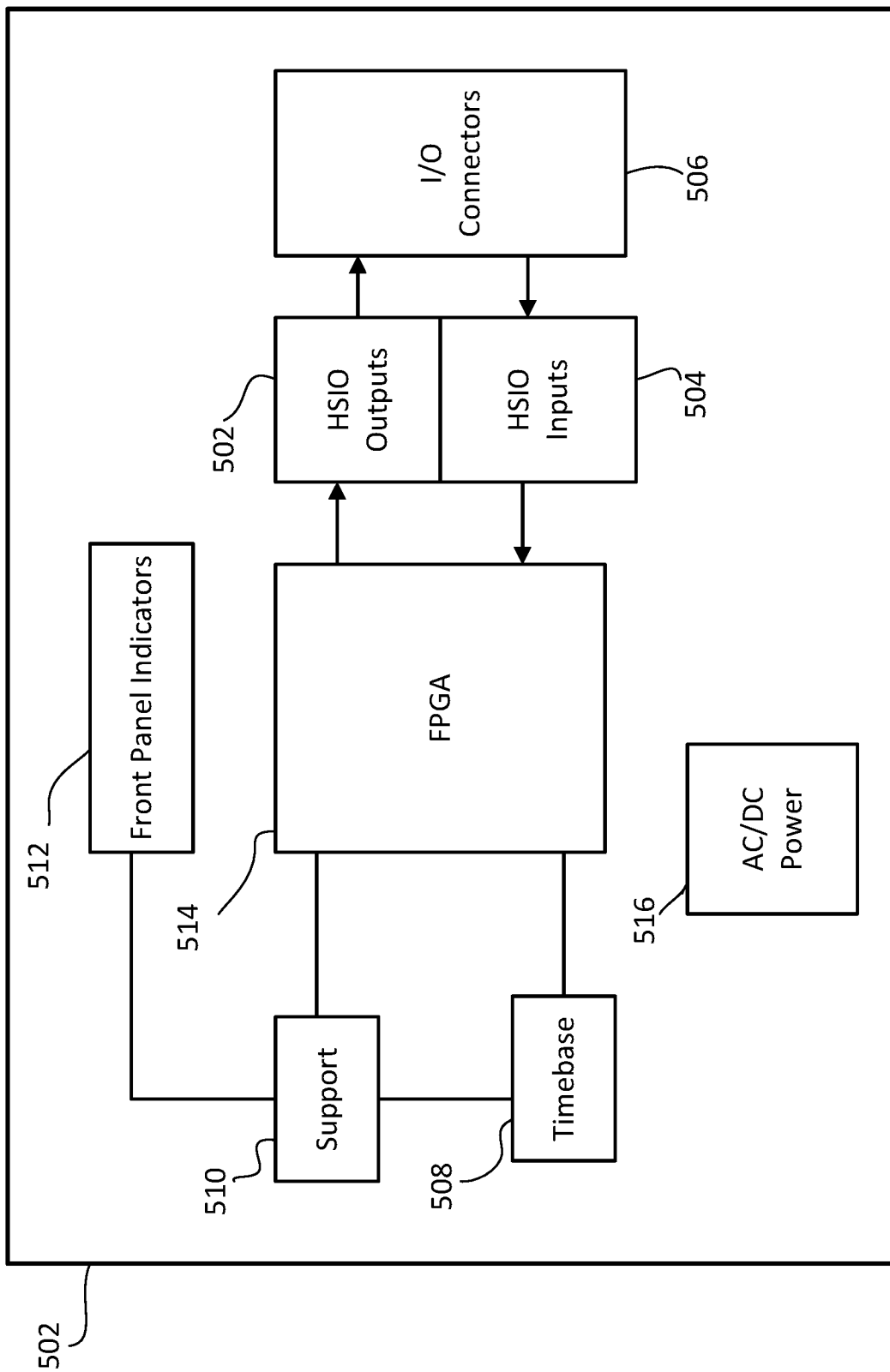
FIG. 5 is a block diagram of an example margin tester for testing the electrical margin of a multi-lane high speed I/O link of a DUT in both Tx and Rx directions, according to an example embodiment.

FIG. 5 is a block diagram of an example margin tester 502 for testing the electrical margin of a multi-lane high speed I/O link of a DUT in either or both Tx and Rx directions, according to an example embodiment. Any of the margin testers 102, 202, 302, and 402 may include the components and/or functions described with reference to the margin tester 502. The margin tester 502 of FIG. 5 includes an FPGA 514 operably coupled to a support unit 510 (which may include Ethernet and other communication functionality), a timebase unit 508 for providing a system reference clock, a high-speed I/O (HSIO) outputs unit 502 and a HSIO inputs unit 504. The margin tester 502 may also be powered by an AC/DC power unit 516. The HSIO outputs unit 502 and HSIO inputs unit 504 are also operably coupled to I/O connectors 506. The FPGA 514 is a semiconductor device that is based around a matrix of configurable logic blocks (CLBs) connected via programmable interconnects. In various embodiments, the margin tester 502 may have fewer or more components than shown and some components or functionality of components shown, although in operable communication with the margin tester 502, may be located outside or separate from the margin tester, or located or integrated in the FPGA 514.

The FPGA 514 can be reprogrammed to desired application or functionality requirements after manufacturing, such as to perform the functionality of the margin tester 502 described herein. For example, firmware on the FPGA 514 may act as a standard PCI Express upstream port, also referred to as an endpoint, (for testing motherboards, as in the embodiment of the add-in card margin tester 202) or standard PCI Express root port, also referred to as an upstream port or root complex, (for testing add-in cards, such as in the embodiment of the motherboard margin tester 302), including some link layer logic for any of the margin testers 100 to infer when errors start at the DUT receiver based on traffic in the opposite direction and to quickly reduce margin stress once errors occur to prevent catastrophic link failure. In some embodiments, the FPGA 514 may be implemented using or may otherwise include a systems-on-modules (SoM) architecture that may incorporate memory, interface, etc. in the FPGA 514. The SoM may be implemented, for example, with an Advanced Reduced Instruction Set (RISC) Machine, originally Acorn RISC Machine (ARM) architecture.

A configuration application and/or script may be implemented via the FPGA 514 or stored on another accessible memory device or other non-transitory computer-readable storage media that enables an end user to easily configure margin tester options of the margin tester 502, including multiple runs with one or more of the following options. In some embodiments, an option for a bit error rate (BER) target may be set for margin scans (milliseconds for E-6 type margins and minutes for E-12 type margins). For example, such targets may include, but are not limited to targets related to: number of times to margin, margin timing and/or voltage; fixing Tx equalization for the margin tester or DUT transmitters; and fixing Rx CTLE and DFE for margin tester receivers. In some embodiments, an optional application and/or script is provided that removes data from the margin tester 502 and provides visualization tools for users to view large sets of margin data across multiple products/samples and view averages, run-to-run variations and trends over time and compare margins across multiple runs on the same DUT with different configuration options (fixed Tx equalization, etc.). In some embodiments, an optional application, which may be implemented on a bootable drive to install on the motherboard under test, is provided that unlocks additional options for motherboard testing including, but not limited to: running in loopback instead of L0 and using specific patterns; using on the on-die margining features in the DUT silicon instead of the voltage swing and Sj margining from the DUT transmitters, and running both ways and comparing results.

In some embodiments, an optional plug-in model is provided that would allow the margin tester configuration application to also configure RX equalization settings on the DUT silicon if a plug-in is provided for that particular DUT silicon. In some embodiments, an optional IBIS-AMI (or similar) software model is provided for each individual margin test unit that may be used by designers and system integrators to include in their simulations to help establish test limits/methodology for specific customer setups. IBIS-AMI is a modeling standard for Serializer/Deserializer (SerDes) physical layers (PHYs) that enables fast, accurate, statistically significant simulation of multi-gigabit serial links. In some embodiments, an optional IBIS-AMI model is provided for the margin test unit, along with customer models (IBIS-AMI or scattering (S) parameters) and can also be utilized by follow-on efforts to include some level of system de-embed for increased accuracy and repeatability. A general model for a margin tester 502 can be provided as the model or a specifically tuned model for a particular margin tester 502 with tuning performed as part of manufacturing test and characterization can be generated.

Figure 6:
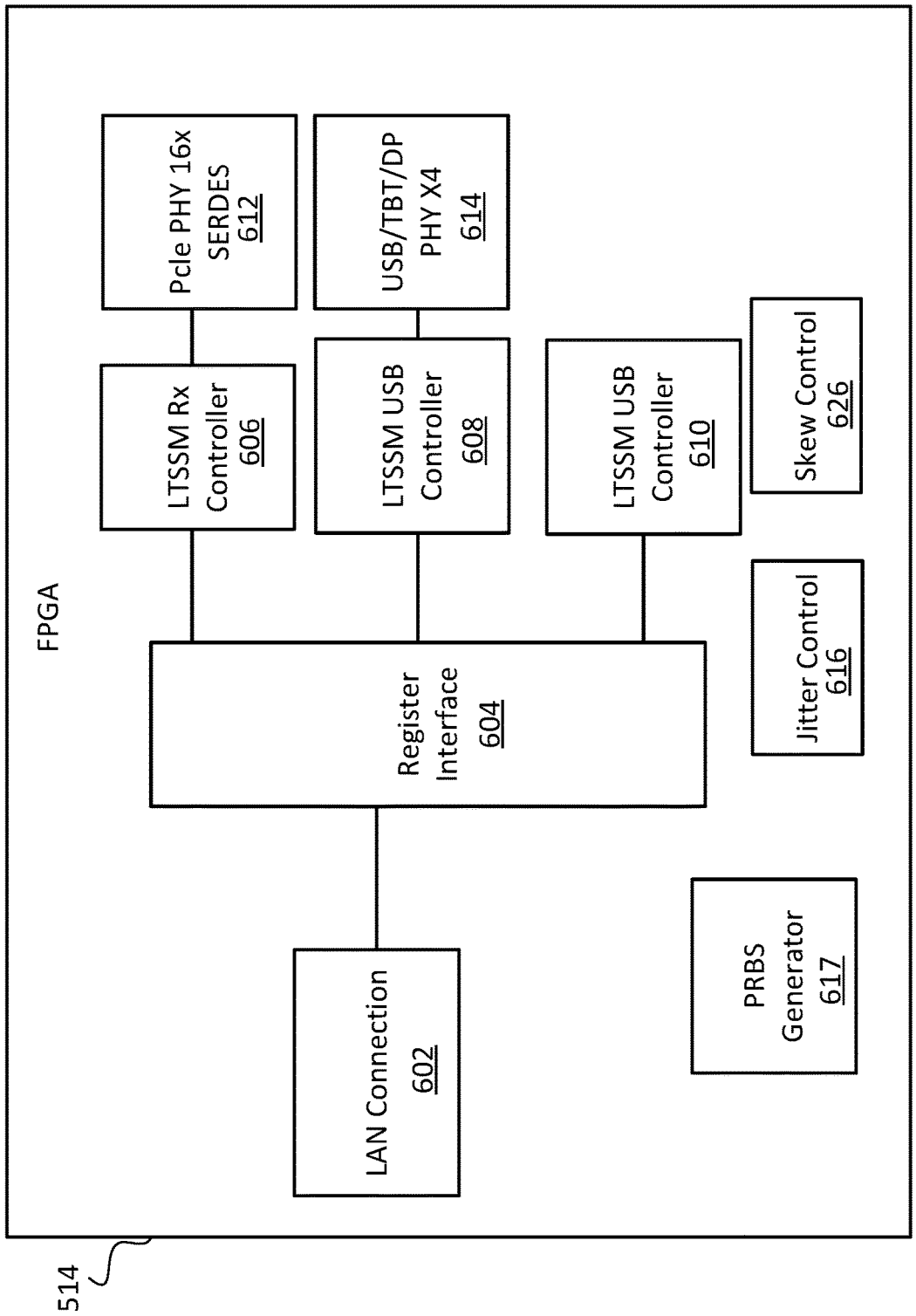
FIG. 6 is a block diagram of an example of a configured field programmable gate array (FPGA) that may be used in a controller of a margin tester for testing the electrical margin of a multi-lane high speed I/O link of a DUT in both Tx and Rx directions, according to an example embodiment.

FIG. 6 is a block diagram of an example of a configured field programmable gate array (FPGA) 514, such as that illustrated in FIG. 5, that may be used in any of the controllers 210, 310, 410 of a margin tester 100 for testing the electrical margin of a multi-lane high speed I/O link of a DUT in either or both Tx and Rx directions, according to an example embodiment. In various embodiments, the FPGA 514 may have more or fewer components than shown and some components shown, and/or functionality of those components, which are in operable communication with the FPGA 514, may be located outside or separate from the FPGA 514. Shown is a register interface 604 operably coupled to a local area network (LAN) connection 602, which may include a SerDes. The register interface 604 is also operably coupled to a Link Training and Status State Machine (LTSSM), Rx controller 606. One of the processes at the physical layer of the operation of the margin tester 100 is the link initialization and training process. In PCI Express devices, this process establishes many important tasks such as link width negotiation, link data rate negotiation, bit lock per lane, symbol lock/block alignment per lane, etc. All these functions are accomplished by the LTSSM devices, which observe the stimulus from remote link partners as well as the current state of the link, and responds accordingly. The register interface 604 is also operably coupled to one or more additional LTSSM controller units, such as a LTSSM Universal Serial Bus (USB) controller 608 and an additional LTSSM USB controller 610. In the example embodiment shown, the LTSSM Rx controller 606 is operably coupled to a PCIe physical layer (PHY) 16× SerDes 612 and the LTSSM USB controller 608 is operably coupled to a USB/Thunderbolt/Displayport (USB/TBT/DP) PHY ×4 unit 614.

A skew control unit 626 can also be a part of, or operably coupled to, the FPGA 514 for controller a programmable skew. Previously, the only test instruments that could generate varying amounts of skew lane-to-lane across multiple lanes were significantly complex and expensive multi-lane BERTs. The multi-lane BERTs, however, are not capable of running a full training protocol like the margin testers disclosed herein, including transmission equalization training for modern protocols like PCIe. As such, previously there was no way to lab test with a protocol and variety of different skews without extremely expensive and complex test set-ups. Examples of the disclosure, however, can add per lane transmission skew in a number of different ways using the skew control unit 626.

For example, the skew control unit 626 may include individual per lane programmable length first in, first out (FIFO) buffers to set the amount of skew per each lane. Additionally or alternatively, the skew control unit 626 may program per lane variable length transmission FIFOs in the FPGA 514 fabric for each lane. Additionally or alternatively, the skew control unit 626 can include a soft controller that can modify the controller logic to have a variable length programmable per lane transmission FIFOs feeding each of the physical layer transmitters.

A jitter control unit 616 is also present as part of, or operably coupled to, the FPGA 514 for controlling a jitter insertion unit such that such that the eye margin expected at the DUT receiver can be varied to specific targets for timing or voltage margin without the need for software running on the DUT.

A Pseudo-Random Binary Sequence (PRBS) generator 617 may be present as part of, or operably coupled to, the FPGA 514 for creating randomized test data for testing the DUT. The PRBS generator 617 may work in cooperation with an external or internal arbitrary waveform generator that is capable of simulating jitter and other testing behaviors, as described below.

When the margin tester 100 is testing a specific protocol, such as PCIe, the margin tester is running the full protocol and can track the link state as the link trains to the active state through the LTSSM controller units 606, 608, and 610. The FPGA 514 of the margin tester 502 can perform margin measurements repetitively as the training proceeds and capture a log of the link training state in time versus the electrical margin in one or both directions.

Figure 7:
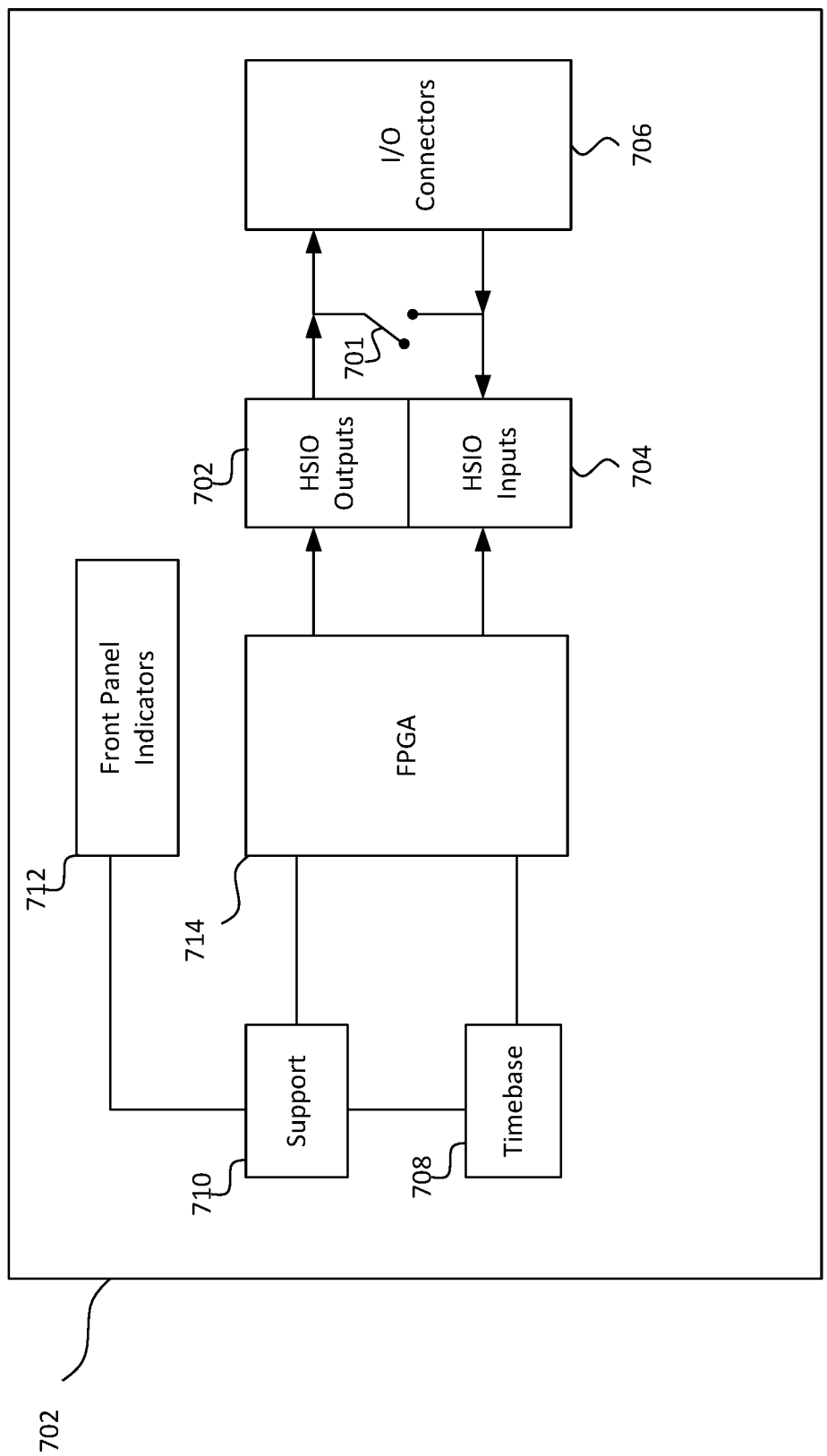
FIG. 7 is a block diagram of another margin tester for testing the electrical margin of a multi-lane high speed I/O link of a DUT in both Tx and Rx directions, according to an example embodiment.

FIG. 7 illustrates an example of a margin tester 702 with self-calibration. Calibration of the margin tester 702 can be performed by electrically connecting the transmitters to the receivers. This can be done, for example, by a switch within the margin tester 702 to electrically connect the transmitters to the receivers in the same margin tester 702. This eliminates a need for external test equipment. This technique may be used in any of the margin testers 100 described above.

FIG. 7 is similar to the embodiment described with reference to FIG. 5. FIG. 7 is a block diagram of an example margin tester 702 for testing the electrical margin of a multi-lane high speed I/O link of a DUT in either or both Tx and Rx directions, as well has having self-calibration. To perform the self-calibration, one or more switches 701 can be provided to connect each of the transmitters in the HSIO outputs unit 702 to each of the receivers in the HSIO inputs unit 704. The transmitters can output a signal and the receivers can receive the signal and determine if the margin tester 702 is within a desired range. A single switch 701 is shown in FIG. 7 for ease of illustration, but as will be understood by one skilled in the art, multiple switches 701 may be provided to connect the transmitters to the receivers. Alternatively to the switch 701, a calibration device or fixture may be provided at the I/O connectors 706 to cause the transmitters to loop back to the receivers to perform self-calibration Different operating modes may be provided for performing calibration of the margin tester 702. For example, self-calibration may be performed only at the factory with a special loopback fixture that can connect the transmitters to the receivers through one or more of the I/O connectors 706. Another operating mode that may be provided is having an end-user perform a self-test of the margin tester 702. This can be performed by activating the switch 701 or inserting a fixture that can route the transmitters to the receivers of the margin tester 702. During the self-test, the margin tester 702 may output to the front panel indicators 712 if the results are outside a specified range.

In some examples, the calibration can be performed in either a protocol mode, a PRBS pattern non-protocol mode, or both. However, in a protocol mode, the I/O connectors 706 may not be able to act as both a host and a test device simultaneously. If the margin tester 702 has two sets of I/O connectors 706, then the margin tester 702 may have to connect the two different sets of I/O connectors 706 or a second margin tester 702 may be connected. The internal calibration can provide faster and potentially less expensive factory calibration for the margin testers 702 than traditional instruments. The internal calibration can also can enable an end user to perform their own calibration testing.

FIGS. 8A, 8B, 8C, and 8D are block diagrams illustrating example output drive options of an FPGA, such as FPGA 514 of the above Figs., that may be used in a controller, such as controller 210, 310, or 410 of a margin tester for testing the electrical margin of a multi-lane high speed I/O link of a DUT in either or both Tx and Rx directions, according to an example embodiment.

FIG. 8A illustrates an FPGA direct drive option 818, which is not buffered and does not include any varactor delay injection or jitter injection. The second output drive option, illustrated in FIG. 8B, is a buffered drive option 820 that includes a linear buffer or limiting amp 826 with differential output voltage (Vod) that does not include any varactor delay injection or jitter injection. The third output drive option, illustrated in FIG. 8C, is a varactor delay injection option 822, which includes a linear buffer 826 and a varactor component 828, which results in intersymbol interference (ISI) plus some delay, which, for example, may be ~3-5 ps. The fourth output drive option, illustrated FIG. 8D, is a jitter injection option 824, which, in one embodiment, may include an optional linear buffer 826, and a jitter injection circuit 830. In one embodiment the jitter injection circuit 830 is an application specific integrated circuit (ASIC) that generates jitter (~100 ps at 32 GBd), which is available from ADSANTEC. In some embodiments, the linear buffer 826 is not included. In other embodiments the jitter injection circuit may be performed by differential noise injection or other known methods.

In various embodiments, different kinds of stresses may be used by the margin tester 100 to identify various different corresponding failure modes including, but not limited to, failure modes related to: assembly; interconnects (surface-mount technology (SMT), packages, connectors, through-holes, vias, etc.); defects; impacts series resistance; failure modes that cause ISI and baseline wander; eye closure impact; failure modes that cause other than width closure; functional test escape; operator configuration error; incoming material; process variation; receiver bandwidth, which is similar to interconnect changes; power supply rejection ratio (PSRR); vertical/horizontal eye closure; PLL stability; design; deltas between lanes. The varactor-based method for jitter insertion may be more effective for exacerbating assembly-related defects.

As described above, the margin tester 100 may be configured or programmed to performing margin testing on a DUT. In some embodiments, after establishing a multi-lane high speed I/O link of the device under test (DUT), the margin tester 100 assesses an electrical margin, in either or both transmit (Tx) and receive (Rx) directions, for each high-speed input/output (I/O) lane of the multi-lane high speed I/O link. For example, the assessing the electrical margin may include injecting adjustable stress on margin test transmitters of the multi-lane high speed I/O link. The adjustable stress may include injection of jitter applied on all lanes of the multi-lane high speed I/O link simultaneously and applying voltage swing. The assessing the electrical margin may also include assessing the electrical margin, in both transmit (Tx) and receive (Rx) directions, simultaneously for each high-speed input/output (I/O) lane of the multi-lane high speed I/O link.

The margin tester 100 may also be used to identify potential DUT assembly or production issues based on margin testing electrical margin of a multi-lane high speed I/O link of a DUT in either or both Tx and Rx directions. In this mode of operation, the margin tester 100 assesses, for each DUT of a plurality of DUTs, timing eye width margin, in either or both Tx and receive Rx directions, for each high-speed input/output (I/O) lane of a multi-lane high speed I/O link of the DUT. In one example, the margin tester 100 identifies a potential DUT design issue based on the detection of the timing eye width margin measurements for each DUT of the plurality of DUTs that are consistently below the minimum predetermined thresholds for the same lane across the plurality of DUTs. The detecting may also or instead include, detecting, based on the assessing, timing eye width margin measurements for multiple DUTs of the plurality of DUTs that are each below a predetermined threshold for different lanes across the multiple DUTs.

In some embodiments the margin tester 100 may be programmed or configured: to choose one or more different high-speed I/O protocols with which to perform margin testing test based on the multi-lane high speed I/O link of the DUT; to test multiple ports of the DUT with mixed protocols simultaneously; to output run-to-run variation in margin over any number of margin test runs of the margin tester on the multi-lane high speed I/O link; to implement fixed Tx Equalization (EQ) on the DUT to test how much of margin variation is due to Tx EQ training variation; to use Fixed CTLE in receivers of the margin tester to test impact of receiver equalization on margin of the multi-lane high speed I/O link of the DUT; to use Decision Feedback Equalization (DFE) in the receivers of the margin tester to test impact of receiver equalization on margin of the multi-lane high speed I/O link of the DUT; to calculate expected margins for the margin tester based on target channels; to automatically produce debug information when low margins are detected as a result of the assessment of the electrical margin of the multi-lane high speed I/O link; to switch to using variable Inter Symbol Interference (ISI) source to find how much ISI causes lanes of the multi-lane high speed I/O link to fail; to test each lane individually to identify an amount of margin loss to due to cross-talk of the multi-lane high speed I/O link of the DUT; turn off DFE in the receivers of the margin tester to assess margin with and without DFE and an amount of non-linear discontinuities in each channel associated with the multi-lane high speed I/O link; to generate characterization data for the margin tester that shows expected margins with reference receivers and typical channels and allows lower than expected margin to be flagged even when the lower than expected margin is consistent across all lanes of the multi-lane high speed I/O link of the DUT and of multiple DUTs; to select from multiple speeds of the multi-lane high speed I/O link on which the assessment of the electrical margin is performed; to infer when errors have happened at the receivers of the DUT based on traffic traveling in an opposite direction on the multi-lane high speed I/O link by the margin tester using protocol specific knowledge to enable the margin tester to perform margin tests on production lines without software on the DUT; to automatically capture Time-Domain Reflectometry readings (TDRs) of low margin channels detected as a result of the assessment of the electrical margin of the multi-lane high speed I/O link; to perform an automated connection to an oscilloscope to automatically capture digitized waveforms when low margins are detected as a result of the assessment of the electrical margin of the multi-lane high speed I/O link; and to configure the one or more of the user-selectable options for the DUT by configuring DUT silicon to implement the one or more of the user-selectable options, for example.

In some embodiments the margin detector 100 may provide options to perform or may perform calibration of the DUT, enabling a user to receive a set of expected margins with a series of reference channels. In these embodiments the calibrated margin tester 100 is configured to measure electrical eye margin in either or both transmit (Tx) and receive (Rx) directions of a device under test (DUT) with a fully running operation link of the DUT without special test modes and to capture full loading and cross-talk effects. An individually calibrated model for the margin tester may also be provided, enabling computation of expected margins with one or more of: individualized system channels, receiver models and transmitter models. Also, a feature in DUT silicon is provided that enables the margin tester to use vendor defined messages or another protocol mechanism to indicate that a margin test is about to take place by the margin tester, causing the DUT silicon to be able to disable logic that would degrade link width or speed of the link due to errors for a duration of the margin test.

A software application of the margin tester is also provided, that enables performance of testing by the margin tester of a channel component under test (e.g., bare printed circuit board (PCB) or a cable) in a testing configuration where a margin tester is used on either or both sides of the channel component under test. In some embodiments, hardware of the margin tester is provided to a company that manufactures a printed circuit board (PCB) and data associated with use of the margin tester is provided to silicon companies which provide silicon used in production of the PCB.

The margin tester 100 may also configure a connected DUT for running margin tests by the margin tester 100 under different conditions for silicon of the DUT. The margin tester 100 may receive a software plug-in that enables configuration and DUT silicon parameters for running the margin tests by the margin tester 100 under the different conditions for the silicon of the DUT. The DUT silicon parameters may include, but are not limited to, one or more of: parameters related to receiver continuous time CTLE and parameters related to DFE.

Benefits, advantages and improvements of the disclosed embodiments include, but are not limited to the following features. Some embodiments can be implemented almost entirely with off-the shelf components including standard FPGAs and sinusoidal jitter injection chips or delay lines and have very low cost compared to traditional BERTs and scopes. An example embodiment can run on full multi-lane links operating in the normal operating state without the need for special software and capturing any effects due to the all lanes operating at once. Another advantage is that embodiments of the present disclosure can test in either or both directions (Tx and Rx) in a single self-contained unit. Various embodiments can also be run in a production environment (for example, in a motherboard production test environment) without the need for any software or modifications on the DUT. Test specific logic, which varies by protocol, may be provided in the margin tester 102 silicon/firmware to recognize very quickly when errors are occurring at the DUT receiver based on the data that is being transmitted back to the margin tester by the device under test. Some example embodiments include features implemented in the DUT silicon to recognize through PCI Express vendor specific messages or other standard protocol features that margin testing is going to take place and place the DUT silicon in a state where it would not degrade the link width and/or speed normally due to errors. This helps to ensure that the margining process to the DUT receivers using noise injection or voltage swing adjustments could occur without risk of degrading the link width or speed through normal protocol mechanisms. This is an alternative to special logic to quickly infer when errors start and reduce stress before link or speed degradation can occur.

Additional features of embodiments of the disclosed technology may include the following functionality that may be performed under control of one the controllers 210, 310, 410 (for example, executing instructions according to a configured FPGA and/or read from another non-transitory computer-readable storage medium): choosing one or more different high-speed I/O protocols with which to perform margin testing test based on the multi-lane high speed I/O link of the DUT; testing multiple ports of the DUT with mixed protocols simultaneously; outputting run-to-run variation in margin over any number of margin test runs of the margin tester on the multi-lane high speed I/O link; implementing fixed Tx Equalization (EQ) on the DUT to test how much of margin variation is due to Tx EQ training variation; using fixed continuous time linear equalization (CTLE) in receivers of the margin tester to test impact of receiver equalization on margin of the multi-lane high speed I/O link of the DUT; using decision feedback equalization (DFE) in the receivers of the margin tester to test impact of receiver equalization on margin of the multi-lane high speed I/O link of the DUT; calculating expected margins for the margin tester based on target channels; automatically producing debug information when low margins are detected as a result of the assessment of the electrical margin of the multi-lane high speed I/O link; switching to using variable Inter Symbol Interference (ISI) source to find how much ISI causes lanes of the multi-lane high speed I/O link to fail; testing each lane individually to identify an amount of margin loss to due to cross-talk of the multi-lane high speed I/O link of the DUT; turning off DFE in the receivers of the margin tester to assess margin with and without DFE and an amount of non-linear discontinuities in each channel associated with the multi-lane high speed I/O link; showing expected margins with reference receivers and typical channels which allows lower than expected margin to be flagged even when the lower than expected margin is consistent across all lanes of the multi-lane high speed I/O link of the DUT and of multiple DUTs; selecting from multiple speeds of the multi-lane high speed I/O link on which the assessment of the electrical margin is performed; inferring when errors have happened at the receivers of the DUT based on traffic traveling in an opposite direction on the multi-lane high speed I/O link by the margin tester using protocol specific knowledge to enable the margin tester to perform margin tests on production lines without software on the DUT; automatically capturing time-domain reflectometry readings (TDRs) of low margin channels detected as a result of the assessment of the electrical margin of the multi-lane high speed I/O link; performing an automated connection to an oscilloscope to automatically capture digitized waveforms when low margins are detected as a result of the assessment of the electrical margin of the multi-lane high speed I/O link; and providing a software plug in to configure the one or more of the user-selectable options for the DUT by configuring DUT silicon to implement the one or more of the user-selectable options. Under control of the controller 210, some of all of the above functionality may also be provided as user-selectable options for operating the margin tester 102.

In an example embodiment, the margin test may include assessing, by the margin tester 100, for each DUT of a plurality of devices under test (DUTs), timing eye width margin, in either or both Tx and Rx directions, for each high-speed input/output (I/O) lane of a multi-lane high speed I/O link of the DUT. The margin tester 100 may then detect timing eye width margin measurements for multiple DUTs of the plurality of DUTs that are each below a predetermined threshold for different lanes across the multiple DUTs. A potential DUT assembly or production issue may then be detected (visually or automatically by the margin tester 102) based on the detection of the timing eye width margin measurements for the multiple DUTs that are each below the predetermined threshold for different lanes across the multiple DUTs.

As an example, in one embodiment, the add-in card margin tester, such as add-in card margin tester 202 shown in FIG. 2, may be used for bench testing/characterization of pre-production samples of a motherboard with one PCIe ×8 slot. The following example test process may be performed using the add-in card margin tester 202 with an E-6 timing eye width margin (Left+right) measured for the slot over several millisecond test on each lane simultaneously. The present example includes timing only for simplicity, but other embodiments may include other measurements. Each measurement in the present example is done 3 times. However, this may be user programmable in various embodiments. The measurements shown in the chart 902 (FIG. 9) are performed at the margin tester receivers as well as the at motherboard DUT receivers. The measurements made at the at motherboard DUT receivers and may be performed in two ways. The first way may be using margin tester jitter (Sj) and voltage swing sweeps. The second way may be using on-die margin testing at the motherboard receiver. For example, the on-die margin testing at the motherboard receiver may, under control of the controller 210 of the add-in card margin tester 202, be run through software on a bootable drive connected to motherboard DUT or basic input/output system (BIOS) software on the motherboard DUT, for supported speeds. In the present example, the measurements are done at 16 GT/s, but may vary and may be user configurable.

Figure 9:
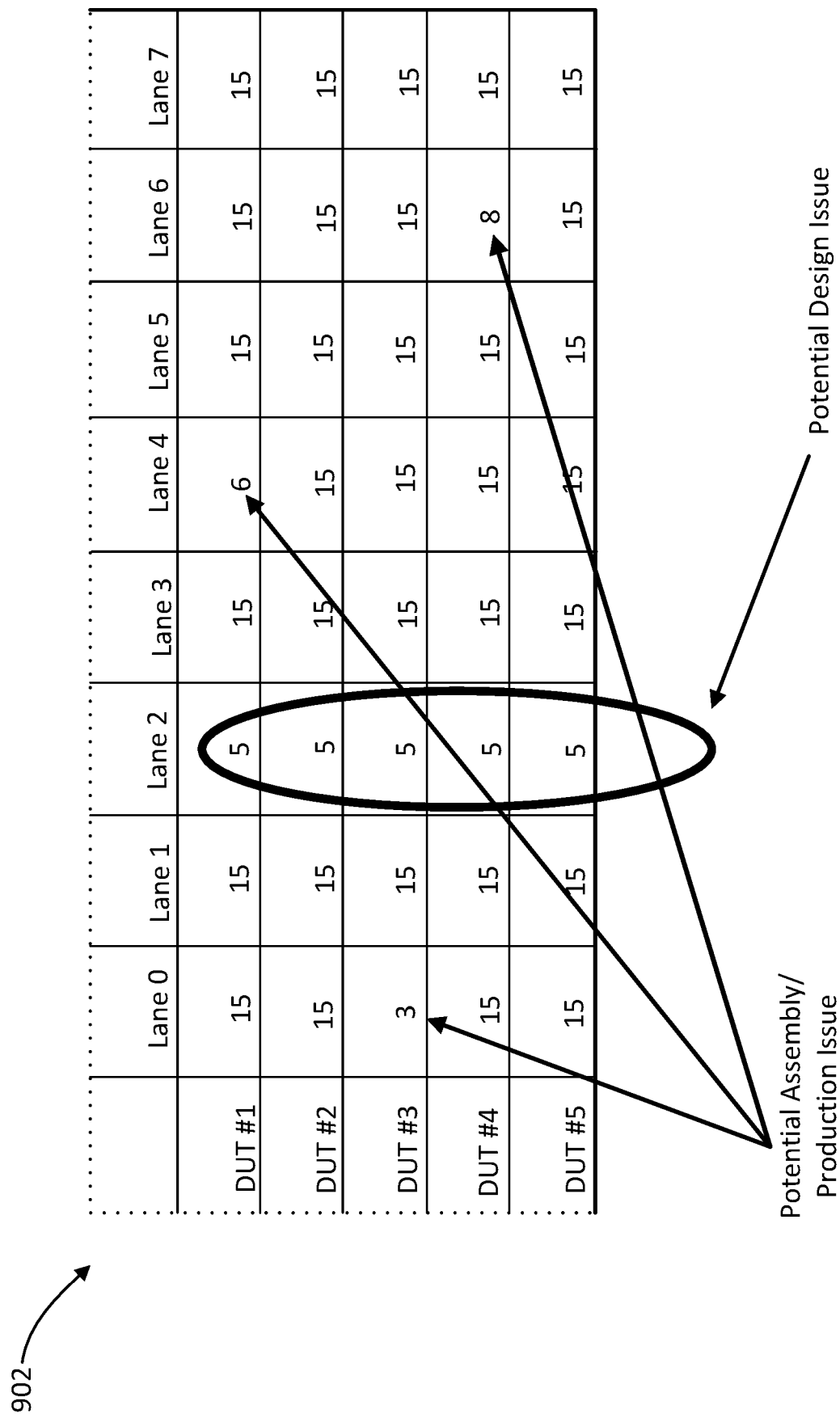
FIG. 9 is a chart showing results of an example margin test of a device under test (DUT) performed by a high-speed I/O margin tester and identification of potential DUT assembly or production issues based on the results of the margin test, according to an example embodiment.

FIG. 9 is a chart 902 showing results of an example margin test of several DUTs performed by the high-speed I/O margin tester 102 and identification of potential DUT assembly or production issues based on the results of the margin test, according to an example embodiment. As shown in the chart 902, the consistently low margin on Lane 2 across all five DUTs, DUT #1 to DUT #5, may be an indicator of a potential design issue of the devices, since the low margin occurs on all of the DUTs. In contrast, the low margin on DUT #1 Lane 4, DUT #3 on Lane 0, and DUT #4 on Lane 6 may be indicators of potential assembly or production issues with those specific lanes on those specific DUTs, since those low margin numbers do not have a set pattern of poor margins.

Embodiments of the invention provide a PRBS testing mode for a margin tester that allows a user to test a DUT while in a non-compliance mode, or otherwise allows the user to flexibly test the DUT by sending a random binary sequence of numbers as test data. PRBS, generally, is a random generated sequence of binary (i.e., 1s and 0s) numbers. Embodiments of the invention may further combine jitter, skew, and voltage amplitude variation to the PRBS data before sending the data as a data signal to the DUT to provide complete margin testing, using randomized data and margins.

PRBS testing allows robust testing to test simulated transmissions or to stress-test certain portions of a DUT. Embodiments of the invention allow the user to define a custom testing procedure without the necessity of using previously defined standard testing patterns, such as compliance testing for various standards. Because PRBS data is randomized data, a margin tester according to embodiments of the invention allows a user to define parameters for testing, and then allow the PRBS testing mode to generate randomized data within the defined parameters. Being a random set of data, the margin tester allows a user to train for variance as opposed to be limited to entirely known states. Using the PRBS testing mode also increases effectiveness of error training, as PRBS data is statistically balanced. Therefore, using PRBS testing mode in a series of tests can show variances in DUT performance over time, deviations across lanes, and can be used in debugging designs.

Figure 10:
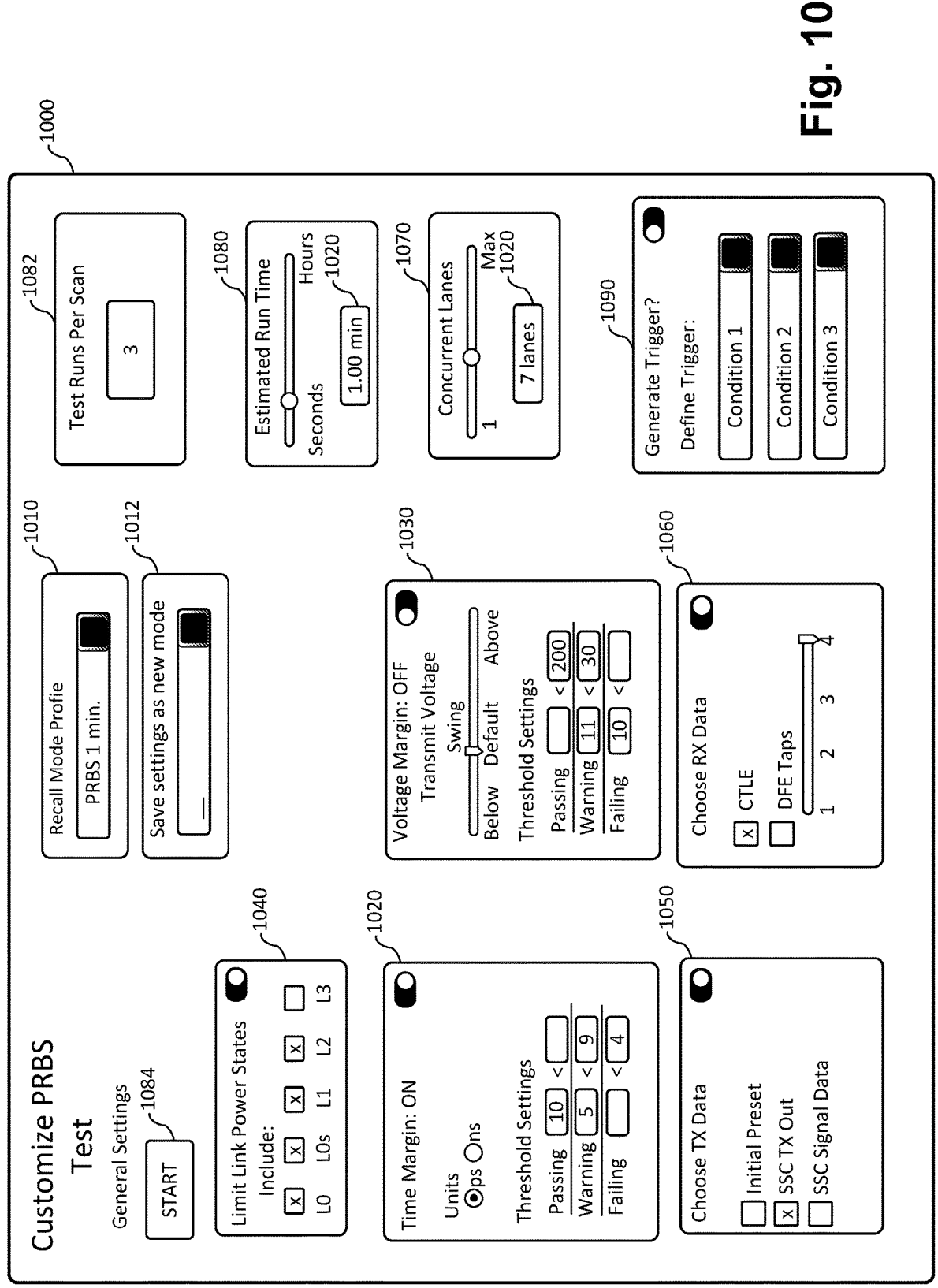
FIG. 10 is an example of an interface that allows a user to define custom tests using a PRBS mode in a margin error tester according to embodiments of the invention.

FIG. 10 is an example of an interface 1000 that allows a user to define custom tests or operating parameters using a PRBS mode in a margin error tester according to embodiments of the invention. The interface 1000 may be integrated into one of the margin testers 100 described above, or may be operatively connected to one of the margin testers in some embodiments.

In general, the interface 1000 allows a user to generate a custom design for a set of test signals that are sent to a DUT in a PRBS mode. As described both above and below, using a PRBS mode to generate test data for a DUT allows the user flexibility and control for specifically testing portions of a DUT that is not possible using conventional, defined, compliance tests.

In a window 1010, the user may select a previously defined testing mode profile, and a window 1012 allows the user to save the current settings as a new mode profile. This functionality allows the user to easily re-run a profile without the need to enter all of the conditions and options available on the interface 1000. In some embodiments the testing mode profiles may be stored in a central repository on a local network, so linked machines could use a profile defined on another machine. In other embodiments the profiles may be stored on a cloud network, such as internet storage, and available to those who have access to the storage location, such as by password access.

In general, an operating envelope or operating sandbox for the PRBS test mode is defined by the user selecting one or more parameters for time margin, voltage margin, and power state. Time margin is selected in a window 1020. If the user does not enable time margin testing, then the PRBS data will be sent to the attached DUT aligned with the clock signal. In other words, no skew or jitter would be added to the timing of the PRBS data when the time margin is de-selected. Differently from present testing systems, embodiments of the invention provide an ability for the user to define passing and failing margin thresholds, rather than being limited to predefined timing margin thresholds. Window 1020 provides an input for a user to custom design such failing and passing thresholds. Further, embodiments of the invention, as also illustrated in window 1020, allows the user to custom define a warning level, i.e., a margin level or margin level interval that will cause the margin tester to generate a warning signal. This functionality is extremely helpful to a design engineer, as present systems provide testing feedback with only pass/fail information, and no warning signals. As illustrated in the window 1020, the user has opted to set a passing threshold when the timing margin is less than 10 ps, a failing threshold when the timing margin is less than 4 ps, and opted to cause the tester to generate a warning signal when the timing margin is between 5 ps and 9 ps.

Window 1030 of interface 1000 provides the user an ability to include voltage margin testing in the DUT testing. As is known in device testing, voltage margin measures the ability of a device to correctly determine a state of a signal based on the signal amplitude, which is varied during voltage margin testing. The window 1030 first allows the user to determine whether he or she will include voltage margin testing as a tested parameter. If not, then the testing data sent to the DUT will not vary in amplitude. If the user selects to include voltage margin testing, then the amplitude of the PRBS data signals will be varied during the PRBS mode test. As with time margin, embodiments of the invention allow the user to select passing and failing voltage margin levels, as well as a range of voltage margin levels that will result in the test system flagging as a warning.

Some embodiments of the PRBS testing mode additionally allow the user to select whether to limit the testing to particular link power states, as illustrated in window 1040. The link power states in the PRBS testing mode are then limited to the selected states, which further allows the user to define very specific DUT tests.

In some embodiments, other minimum and/or maximum operating parameters may be included as a limitation to the testing environment, such as temperature ranges of the DUT or other testing parameters, such as those described above.

A window 1080 allows the user to control how long the test will run. Because the margin tester according to embodiments of the invention is sending random data to the DUT, and is not operating according to a pre-defined testing plan, the user directs the test duration. Test durations may run from seconds to hours, or even longer, and the duration may be selected with a slider in the window 1080 or entered directly in the text box. Selecting a fast test may highlight significant errors early, while selecting a longer test may be useful for stress-testing the DUT with large amounts of PRBS data.

A window 1070 allows the user to control how many concurrent lanes of the DUT are tested. If the maximum number of lanes is selected, then of course all lanes are tested with PRBS data. If fewer than the maximum number of lanes is selected, the margin tester according to embodiments of the invention may randomly select which, and how many, up to the maximum number of lanes, will be tested. For example, if 7 lanes are selected of an 8 lane device, then one or more lanes of the DUT will not be being tested during any particular test run. As the PRBS test is a random test, the non-selected lanes may also be randomly chosen.

A window 1050 allows the user to choose if and, if so, how data may be transmitted to the transmitter (Tx) channel of the DUT. The data may be sent at the pre-set value for the state of the device, i.e., based on an earlier defined value. Or, the data may be sent using a form of Spread Spectrum Clocking (SSC), which allows for variable rate testing, as opposed to the pre-defined rate. Similarly, a window 1060 allows the user to choose whether to use a Continuous Time Linear Equalizer (CTLE) or a Decision Feed-back Equalizer (DFE) on data received from the receiver (Rx) channel.

When the user enters the PRBS test mode, by pressing a start button 1084, the margin tester begins sending randomly generated data to the DUT. The raw binary data is generated by the PRBS generator. Then, if the user has enabled time margin testing in the window 1020, the timing of the data will be randomly varied up to the maximum timing error, which may also be user selected. Further, if the user has enabled voltage margin testing in the window 103, the amplitude of the signal transmitting the data will be randomly varied up to the maximum amplitude error, which may also be user selected. The PRBS generated data, as modified to test both timing error and voltage error, then becomes the set of testing signals sent to the DUT during the PRBS testing mode. Also, because testing signals are sent at the physical layer, it is possible to mix noise with the PRBS generated data and send the mixed version as an analog signal to the DUT, rather than as a modified digital signal.

The random data supplied to the DUT allows the user to train for variance as opposed to entirely known states. In other words, the random nature of the PRBS test mode will likely cause responses in the DUT that are beyond those found in a standard testing plan. For instance the PRBS data may cause the DUT to jump from a low link power state to a high link power state without having passed through intermediate states, and then the margin tester can determine the response of the DUT. Using such random data, rather than a pre-defined test pattern, may cause the DUT to behave in unexpected ways, or enter unexpected modes, which may be further investigated once detected. In this way the PRBS testing mode allows the user to explore DUT operation quickly and efficiently, especially compared to following pre-defined testing scenarios. Further, the PRBS testing mode uncovers potential issues that would not be uncovered running pre-defined testing scripts. Also, PRBS testing mode provides an ability to provide stress testing, in a highly configurable way, to particular areas of interest within the DUT.

If an oscilloscope is part of the testing apparatus, the oscilloscope may monitor data on the DUT during the PRBS testing mode. This additional information measured by the oscilloscope may further inform the tester about DUT operation. As described above, the data connection 103 between the margin tester and the oscilloscope may include a clock signal, so the margin tester can pair with other measurement equipment, like the oscilloscope described above. The margin tester that includes a PRBS testing mode combined with an oscilloscope could operate similar to a BERT and oscilloscope, and provide the same or similar functionality for testing a DUT at much lower cost. A user could define the testing parameters of the PRBS testing mode of the margin tester, as described above with reference to FIG. 10, and then drive the DUT to failure while the oscilloscope monitors the traffic on the lanes of the DUT. The margin detector could report the DUT errors as well as provide an eye diagram of the channels, while the oscilloscope can be used to capture the data that caused the particular error.

Relatedly, the margin tester with a PRBS testing mode according to embodiments of the invention may also be used to generate a trigger event based on a DUT response provoked during the PRBS test. The trigger could then be sent to the connected oscilloscope to capture the data traffic on the lanes of the DUT to allow a user to interpret the specific data, which was generated by the PRBS testing mode, to cause the trigger event. The trigger can be defined in a window 1090 of the interface 1000 of FIG. 10. The trigger definition need not be one that is only recognized by an oscilloscope, but could be configured to generate a trigger on event states, for example, a particular voltage state or level. Other triggers are also possible.

Another benefit of the PRBS testing mode is that the DUT is not necessarily entering a particular operating state, so test equipment is able to allow the user to investigate DUT operation without any state limitations.

Figure 11:
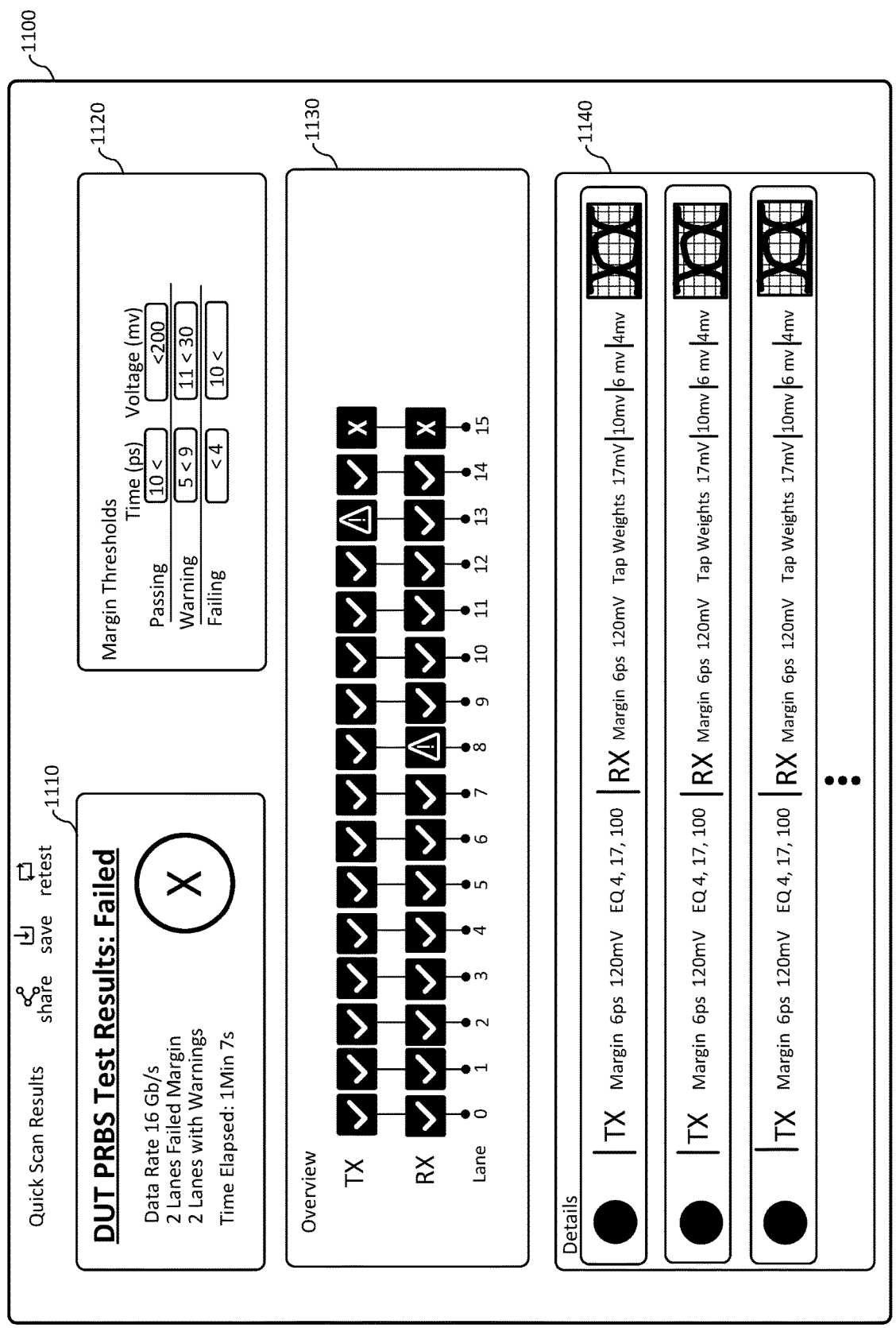
FIG. 11 is an example of an interface that shows the results of the custom defined test defined using the interface of FIG. 10, according to embodiments of the invention.

FIG. 11 is an example of an interface 1100 that shows the results of the custom defined test defined using the interface of FIG. 10, according to embodiments of the invention. The interface 1100 may be integrated into one of the margin testers 100 described above, or may be operatively connected to one of the margin testers in some embodiments.

The interface 1100 includes several reporting windows. An overall reporting window 1100 informs the user the status of the PRBS test. In the illustrated embodiment, the overall test failed. Details in the window 1100 indicate that two lanes failed their user-defined margin parameters, described above. The window 1100 also indicates that two lanes passed the margin parameters, but they were within a threshold, i.e., the warning threshold defined in the interface 1000 of FIG. 10, of failing the test. Including a settable warning threshold is a useful tool to a developer, as it provides an ability to see if a parameter is near a threshold yet still passes, something that is very difficult or impossible to clearly visualize using existing tools. The window 1100 also reports that the time elapsed was 1 minute, seven seconds. The actual run time of the test may not match the expected run time selected in window 1080 (FIG. 10), because, for example, the time variation in different power up and link connection states, or other state changes of the DUT.

The reporting window 1120 recalls the margin thresholds that the user selected for the particular PRBS test.

The reporting windows 1130 and 1140 are related to one another, and illustrate the test results of the PRBS test. In these reported results, lane 15 failed margin testing. Also, lane 8 generated a warning on the Receiver side of the DUT while lane 13 generated a warning on the Transmitter side of the DUT. Details of the test results are illustrated in window 1140, which is truncated in FIG. 11. The details include numerical indications of the transmitted and received data, and additionally, if the test is long enough, produces an eye diagram illustrating the margin health of the channel. Although not illustrated, the details for channels 8, 13, and 15 provide information about why they failed or were within a threshold of failing the tests.

Aspects of the disclosure may operate on a particularly created hardware, on firmware, digital signal processors, or on a specially programmed general purpose computer including a processor operating according to programmed instructions. The terms controller or processor as used herein are intended to include one or more microprocessors, microcomputers, Application Specific Integrated Circuits (ASICs), and dedicated hardware controllers working independently or in conjunction with each other. One or more aspects of the disclosure may be embodied in computer-usable data and computer-executable instructions, such as in one or more program modules, executed by one or more computers (including monitoring modules and controllers), or other devices. Generally, program modules include routines, programs, objects, components, data structures, etc. that perform particular tasks or implement particular abstract data types when executed by a processor in a computer or other device. The computer executable instructions may be stored on a non-transitory computer readable storage medium such as a hard disk, optical disk, removable storage media, solid state memory, DDR memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the disclosed technologies are provided below. An embodiment of the technologies may include one or more, and any combination of, the examples described below.

Example 1 is a margin testing device, including at least one interface structured to connect to a device under test (DUT), one or more controllers structured to create a set of test signals based on a sequence of pseudo random data and one or more pre-defined parameters, and an output structured to send the set of test signals to the DUT.

Example 2 is an example according to Example 1 in which the pre-defined signal parameters include time margin, voltage margin, or both time margin and voltage margin.

Example 3 is an example according to any of the previous Examples, further comprising an arbitrary waveform generator input to the one or more controllers, and in which the one or more controllers combines a signal received on the arbitrary waveform generator input with a randomly generated binary number to create the sequence of data.

Example 4 is an example according to any of the previous Examples, further including a trigger output that generates a trigger signal based on a state of the DUT.

Example 5 is an example according to any of the previous Examples, further comprising a user interface through which a user may modify the pre-defined signal parameters used to create the operating envelope.

Example 6 is an example according to Example 5 in which test results are displayed on a test report screen of the user interface, and in which one of the test results is that a particular test passed within a threshold amount of failing.

Example 7 is an example according to Example 6 in which the threshold amount is user definable.

Example 8 is a method of operating a margin tester, including generating a pseudo random binary data sequence, creating a set of test signals based on the generated sequence of data and one or more pre-defined parameters, and sending the set of test signals to the DUT.

Example 9 is the method of Example 8 in which the limiting one or more pre-defined signal parameters includes adding include a time margin to the generated sequence of data, adding a voltage margin to the generated sequence of data, or adding both a time margin and a voltage margin to the generated sequence of data.

Example 10 is the method of any of the previous Example methods, in which generating a pseudo random binary data sequence comprises generating a pseudo random binary data sequence using an arbitrary waveform generator as an input.

Example 11 is the method of any of the previous Example methods, further including a generating a trigger signal based on a state of the DUT.

Example 12 is the method of any of the previous Example methods, further comprising accepting the pre-defined signal parameters from a user through a user interface.

Example 13 is the method of Example 12, further comprising displaying test results on a test report screen of the user interface, in which one of the test results is that a particular test passed within a threshold amount of failing.

Example 14 is the method of Examples 12-13 methods, further comprising accepting the threshold amount from the user through the user interface.

Example 15 is a testing system, including a device under test, an oscilloscope coupled to the device under test through one or more data probe through which the oscilloscope may capture signals on the device under test, and a margin testing device, which includes at least one interface structured to connect to the device under test, a pseudo random binary sequence generator configured to generate a sequence of data, a controller to generate test signals that represent the generated sequence of data, an operating envelope definer to limit the test signals to one or more pre-defined signal parameters, and an output structured to send the limited test signals to the device under test.

Example 16 is the system of Example 15, in which the pre-defined signal parameters include time margin, voltage margin, or both time margin and voltage margin.

Example 17 is the system of any of the previous Examples 15-16, further comprising an arbitrary waveform generator input to the pseudo random binary sequence generator, and in which the pseudo random binary sequence generator combines a waveform signal received on the waveform generator input with a randomly generated binary number to create the sequence of data.

Example 18 is the system of any of the previous Examples, further including a trigger output of the margin testing device that generates a trigger signal based on a state of the DUT, and further including a trigger input of the oscilloscope to receive the trigger signal.

Example 18 is the system of any of the previous Examples, further comprising a user interface through which a user may modify the pre-defined signal parameters used to create the operating envelope.

Example 18 is the system of any of the previous Examples, in which test results are displayed on a test report screen of the user interface, and in which one of the test results is that a particular test passed within a threshold amount of failing.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the disclosure have been illustrated and described for purposes of illustration, it will be understood that various modifications may be made without departing from the spirit and scope of the disclosure. Accordingly, the disclosure should not be limited except as by the appended claims.

We claim:

1. A margin testing device, comprising:
at least one interface structured to connect to a device under test (DUT);
one or more controllers structured to create a set of test signals based on a sequence of pseudo random data and one or more pre-defined parameters; and
an output structured to send the set of test signals to the DUT.

2. The margin testing device of claim 1 in which the pre-defined parameters include parameters for testing time margin, voltage margin, or both time margin and voltage margin.

3. The margin testing device of claim 1, further comprising an arbitrary waveform generator input to the one or more controllers, in which the one or more controllers combines a signal received on the arbitrary waveform generator input with a randomly generated binary number to create the sequence of pseudo random data.

4. The margin testing device of claim 1, further comprising a trigger output that generates a trigger signal based on a state of the DUT.

5. The margin testing device of claim 1, further comprising a user interface through which a user may modify the pre-defined parameters used to create an operating envelope that limits the test signals in the set of test signals.

6. The margin testing device of claim 5 in which test results are displayed on a test report screen of the user interface, and in which one of the test results is that a particular test passed within a threshold amount of failing.

7. The margin testing device of claim 6 in which the threshold amount is user definable.

8. A method of operating a margin tester, comprising:
generating a pseudo random binary data sequence;
creating a set of test signals based on the pseudo random binary data sequence and one or more pre-defined parameters; and
sending the set of test signals to a device under test (DUT).

9. The method of claim 8 further comprising limiting the one or more pre-defined parameters by adding a time margin to the pseudo random binary data sequence, adding a voltage margin to the pseudo random binary data sequence, or adding both a time margin and a voltage margin to the pseudo random binary data sequence.

10. The method of claim 8, in which generating a pseudo random binary data sequence comprises generating a pseudo random binary data sequence using an arbitrary waveform generator as an input.

11. The method of claim 8, further comprising generating a trigger signal based on a state of the DUT.

12. The method of claim 8, further comprising accepting the pre-defined parameters from a user through a user interface.

13. The method of claim 12, further comprising displaying test results on a test report screen of the user interface, in which one of the test results is that a particular test passed within a threshold amount of failing.

14. The method of claim 13, further comprising accepting the threshold amount from the user through the user interface.

15. A testing system, comprising:
an oscilloscope coupleable to a device under test through one or more data probes through which the oscilloscope may capture signals on the device under test; and
a margin testing device, including:
at least one interface structured to connect to the device under test,
a pseudo random binary sequence generator configured to generate a sequence of pseudo random binary data,
a controller to generate test signals that represent the sequence of pseudo random binary data,
an operating envelope definer to limit the test signals to one or more pre-defined signal parameters, and
an output structured to send the limited test signals to the device under test.

16. The testing system of claim 15 in which the one or more pre-defined signal parameters include time margin, voltage margin, or both time margin and voltage margin.

17. The testing system of claim 15, further comprising an arbitrary waveform generator input to the pseudo random binary sequence generator, in which the pseudo random binary sequence generator combines a waveform signal received on the waveform generator input with a randomly generated binary number to generate the sequence of pseudo random binary data.

18. The testing system of claim 15, further comprising a trigger output of the margin testing device that generates a trigger signal based on a state of the device under test, and further comprising a trigger input of the oscilloscope to receive the trigger signal.

19. The testing system of claim 15, further comprising a user interface through which a user may modify the pre-defined signal parameters used to create an operating envelope.

20. The testing system of claim 19 in which test results are displayed on a test report screen of the user interface, and in which one of the test results is that a particular test passed within a threshold amount of failing.

\* \* \* \* \*